No. 610,911. Patented Sept. 20, 1898.
S. H. MILLER.
HOG NOSE CUTTER.
(Application filed Oct. 9, 1897.)
(No Model.)
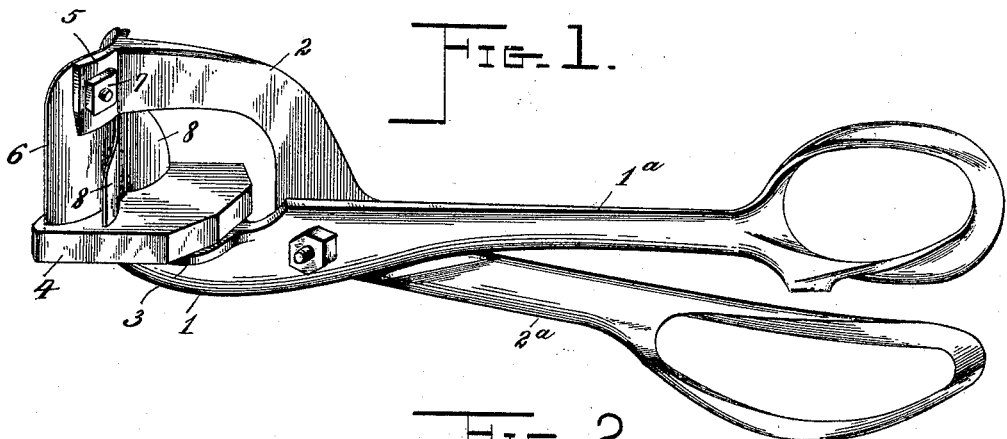
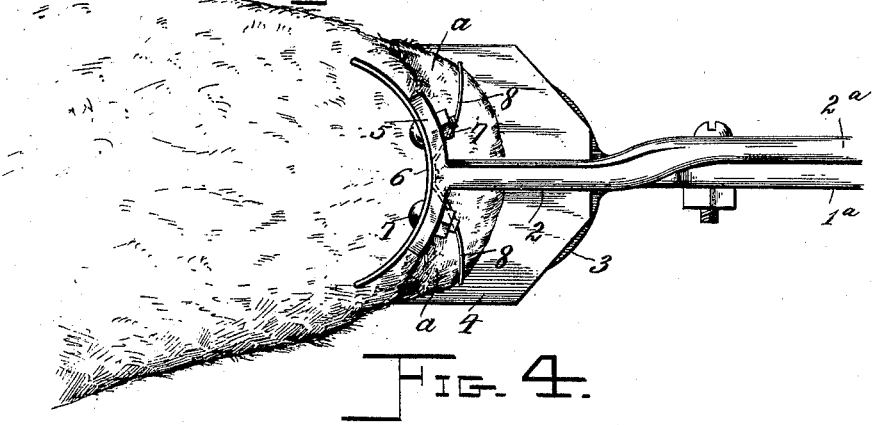
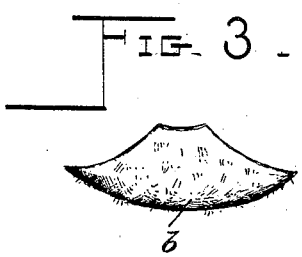
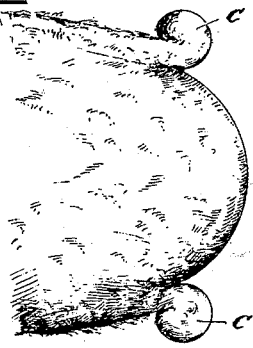
Inventor
Samuel H. Miller
Witnesses
By his Attorneys,

UNITED STATES PATENT OFFICE.

SAMUEL H. MILLER, OF NASHVILLE, TENNESSEE.

HOG-NOSE CUTTER.

SPECIFICATION forming part of Letters Patent No. 610,911, dated September 20, 1898.

Application filed October 9, 1897. Serial No. 654,681. (No model.)

*To all whom it may concern:*

Be it known that I, SAMUEL H. MILLER, a citizen of the United States, residing at Nashville, in the county of Davidson and State of Tennessee, have invented a new and useful Hog-Nose Cutter, of which the following is a specification.

My invention relates to tools for cutting hog-snouts to prevent rooting.

Various tools of this class have been devised heretofore for operating upon hog-snouts in such a way as to render the animals incapable of rooting without resorting to the use of rings and similar expedients; but it is desirable to so cut the snout as to deprive it of muscular side motion. With this object in view instruments have been devised for slitting the snout transversely in a curved line approximately following the conformation of the front of the snout; but the objection to this form of gash is that in time it becomes healed and does not interfere materially with the rooting operations of the animal. Another method involves the cutting of the above-mentioned partially-severed portion to allow the separated ends to hang down in front of the end of the snout, and thus prevent the animal from forcing its snout into the earth. I have found, however, in practice that all of the above methods are open to objections of one form or another, the most important of which is that if the cartilage is cut sufficiently to deprive it of side muscular action it is unnecessarily lacerated; and a further disadvantage of the above-mentioned methods is that in some cases the operation must be repeated after a time, because of the healing or subsequent hardening of the newly-exposed parts. Therefore it is my object to provide a tool which not only severs the cartilage, but so cuts the extremity of the snout that as it heals a callous growth forms at each side of the end of the snout, which effectually prevents rooting and constitutes a permanent obstacle thereto. To accomplish this object, I employ a main blade of cross-sectionally-curved contour to transversely gash the snout in a line approximately parallel with the edge thereof, and in connection therewith I employ auxiliary blades deflected rearwardly and laterally from the main blade and intersecting the latter at a point contiguous to its center, the deflection of said auxiliary blades from the main blade being greater than the distance which the main blade is held from the edge of the snout, whereby a portion of the center of the rim of the snout, which is partly severed by the main blade, is detached and wholly removed, thus leaving two inwardly-extending projections on the snout which terminate in sharp points. As the snout heals after the cutting operation these sharp extremities of the loosened tongues of flesh curl outwardly and produce calloused projections located at opposite ends of the main transverse gash which is formed by the main blade.

In order that the construction and advantages of the improved nose-cutting device may be fully understood, I will describe the same in detail in connection with the accompanying drawings, wherein—

Figure 1 is a perspective view of a tool constructed in accordance with my invention. Fig. 2 is a plan view of the same as seen when applied in the operative position to a hog-snout. Fig. 3 is a plan view of the detached portion of the snout which is removed by the auxiliary blades. Fig. 4 is a view of the snout as seen after the healing operation has proceeded sufficiently to form the callous protuberances at opposite ends of the transverse gash.

Similar numerals and letters of reference indicate corresponding parts in all the figures of the drawings.

The jaws 1 and 2 of the tool embodying my invention are provided with handles $1^a$ and $2^a$, respectively, said jaw 1, which is arranged lowermost in operation, being extended laterally to form a rest 3 to support an anvil-block 4, which is preferably of soft material and may consist of an antiseptic material to prevent the carrying of disease from one animal to another. The other or upper jaw terminates in a horizontally segmental seat 5, in which is fitted the convex side of a cross-sectionally curved—namely, concavo-convex—main blade 6, which is adapted approximately to the curvature of the front edge of a hog-snout. Any suitable means may be employed for securing this main blade in its seat, such as bolts 7 engaging the lateral ears forming the seat.

The main blade, which is convexed rearwardly to transversely gash the snout, is assisted in the operation for which the tool is designed by laterally-extending auxiliary blades 8, which intersect the main blade at points near its center and diverge rearwardly and laterally from said point of intersection in forwardly-concaved and rearwardly-convexed planes, the outer extremities of the auxiliary blades being located at such a distance from the main blade as to reach beyond the edge of the snout, and thus cut entirely through the partly-severed rim formed by the main blade, the lines of cutting being inclined or diverged to form inwardly-extending separate tongues $a$ on the snout of the animal. The detached fragment $b$ of the snout between the extremities of these inwardly-extending tongues $a$ (and which is shown in detail in Fig. 3) leaves the tongues separated at their inner ends and reduced approximately to points, which in the course of the healing operation curl outwardly and finally form callous protuberances or knobs $c$ at the opposite ends of the transverse cut in the snout, and hence at opposite sides of the front end of the snout, thus exposing the rear wall of the transverse cut. This formation, in view of the fact that the cartilage has been severed to destroy any lateral muscular motion, permanently incapacitates the animal for rooting. The final healing of the parts does not restore them to their former capacity, and hence there is no necessity at a subsequent time to repeat the operation.

From the above description it will be seen that the essential feature of my invention is the provision of cutting-blades so arranged as to transversely sever the cartilage of the snout and form two inwardly-extending and inwardly-reduced tongues of flesh which terminate short of each other, the reduction or tapering of the inner ends of said tongues reducing the weights of said inner ends, and thereby enabling them to curl in the operation of healing. The detachment of the intermediate portion of the snout between the extremities of said tongues effectually prevents the restoration of the snout, in the course of healing, to its original condition.

In practice I prefer to employ an antiseptic anvil-block consisting of absorbent material, such as soft wood, which has been treated, for a sufficient length of time to saturate it, with an antiseptic, such as that formed by the mixture of bichlorid of mercury, four drams; carbolic acid, two ounces; water, one pint. The block should be soaked in a mixture of the above ingredients for twelve hours, or a sufficient length of time to insure the complete saturation thereof, after which it may be used in the relation described without danger of conveying disease, such as hog-cholera, from one bunch of stock to another. The effect of the said mixture is to destroy the germs of disease, which will be understood by those familiar with the art.

Various changes in the form, proportion, and the minor details of construction may be resorted to without departing from the spirit or sacrificing any of the advantages of this invention.

Having described my invention, what I claim is—

1. A hog-nose cutter having cutting edges arranged in pairs extending in different directions from an intermediate point, with the members of each pair diverging toward their remote ends, to gash the snout upon lines forming a plurality of inwardly-extending tapered tongues, substantially as specified.

2. A hog-nose cutter having a main blade and a plurality of auxiliary blades which intersect the main blade contiguous to its center, and diverge laterally and rearwardly therefrom, to gash a snout upon opposite laterally-divergent lines to form inwardly-extending terminally-tapered tongues, substantially as specified.

3. A hog-nose cutter having jaws and operating devices, one of the jaws carrying an anvil-block, and main and auxiliary blades carried by the other jaw, the main blade being cross-sectionally concavo-convex with its convex side arranged toward the rear, and the auxiliary blades being arranged to intersect the main blade contiguous to its center and being cross-sectionally concavo-convex, and being rearwardly and laterally divergent from the main blade, substantially as specified.

In testimony that I claim the foregoing as my own I have hereto affixed my signature in the presence of two witnesses.

SAMUEL H. MILLER.

Witnesses:
E. W. NAPIER,
J. S. MARTIN.